(12) United States Patent
Marks et al.

(10) Patent No.: US 9,169,417 B2
(45) Date of Patent: Oct. 27, 2015

(54) POWDER COATINGS COMPOSITIONS

(75) Inventors: Maurice J. Marks, Lake Jackson, TX (US); Fabio Aguirre Vargas, Lake Jackson, TX (US)

(73) Assignee: Blue Cube IP LLC, Midland, MI (US)

( * ) Notice: Subject to any disclaimer, the term of this patent is extended or adjusted under 35 U.S.C. 154(b) by 195 days.

(21) Appl. No.: 13/805,022

(22) PCT Filed: Jun. 20, 2011

(86) PCT No.: PCT/US2011/041018
§ 371 (c)(1),
(2), (4) Date: Dec. 18, 2012

(87) PCT Pub. No.: WO2011/163100
PCT Pub. Date: Dec. 29, 2011

(65) Prior Publication Data
US 2013/0090435 A1   Apr. 11, 2013

Related U.S. Application Data

(60) Provisional application No. 61/357,644, filed on Jun. 23, 2010.

(51) Int. Cl.
| | | |
|---|---|---|
| C08G 59/24 | (2006.01) | |
| C08L 63/00 | (2006.01) | |
| B32B 27/38 | (2006.01) | |
| C09D 163/00 | (2006.01) | |
| C08G 59/14 | (2006.01) | |
| C08G 18/00 | (2006.01) | |
| C08G 59/02 | (2006.01) | |
| C09D 171/00 | (2006.01) | |

(52) U.S. Cl.
CPC .............. *C09D 163/00* (2013.01); *B32B 27/38* (2013.01); *C08G 18/003* (2013.01); *C08G 59/027* (2013.01); *C08G 59/1438* (2013.01); *C08G 59/245* (2013.01); *C08L 63/00* (2013.01); *C09D 171/00* (2013.01); *C08G 2150/20* (2013.01); *C08G 2650/56* (2013.01)

(58) Field of Classification Search
None
See application file for complete search history.

(56) References Cited

U.S. PATENT DOCUMENTS

| | | | |
|---|---|---|---|
| 2,456,408 A | 12/1948 | Greenlee | |
| 2,924,580 A | 2/1960 | Phillips et al. | |
| 2,982,752 A * | 5/1961 | Phillips et al. | 525/526 |
| 3,737,406 A | 6/1973 | D'Alelio | |
| 3,804,735 A | 4/1974 | Radlove et al. | |
| 3,892,819 A | 7/1975 | Najvar | |
| 3,948,698 A | 4/1976 | Elrick et al. | |
| 4,014,771 A | 3/1977 | Rosenkranz et al. | |
| 4,119,609 A | 10/1978 | Allen et al. | |
| 4,431,782 A | 2/1984 | Harris et al. | |
| 7,709,582 B2 | 5/2010 | Kouchi et al. | |
| 8,445,590 B2 | 5/2013 | Shirrell | |
| 2010/0227090 A1 * | 9/2010 | Liao et al. | 428/35.8 |
| 2011/0245434 A1 * | 10/2011 | Marks | 525/481 |
| 2012/0245306 A1 * | 9/2012 | Marks | 525/526 |

FOREIGN PATENT DOCUMENTS

| | | |
|---|---|---|
| EP | 113575 | 12/1983 |
| WO | 199015089 | 12/1990 |
| WO | 2009035860 | 3/2009 |

OTHER PUBLICATIONS

Reinking, J. Poly Sci. 1963, 7, 2135-2153.
"Handbook of Epoxy Resins" Lee, H. and Neville, K. McGraw-Hill Book Company, New York, 1967, Chapter 2.

* cited by examiner

*Primary Examiner* — Robert Sellers
(74) *Attorney, Agent, or Firm* — Joe R. Prieto

(57) ABSTRACT

A solid epoxy resin powder coating composition which includes a divinylarene dioxide resin as one component; and wherein the solid epoxy resin powder coating composition can be formed by blending or reacting various other components with the divinylarene dioxide resin. For example, other components can include other epoxy resins; phenolic resins; or monomeric and/or polymeric isocyanates. The powder coating composition or formulation may advantageously provide, for example, a Fusion Bonded Epoxy coating on a substrate.

14 Claims, No Drawings

POWDER COATINGS COMPOSITIONS

BACKGROUND OF THE INVENTION

1. Field of the Invention

The present invention is related to solid curable epoxy resin powder coating compositions derived from divinylarene dioxides, particularly those derived from divinylbenzene dioxide.

2. Description of Background and Related Art

Solid powder coating formulations are known in the prior art. For example, U.S. Pat. No. 2,456,408 describes solid epoxy resins (SERs) prepared from epoxy resins and diphenols; and Reinking, J. Poly. Sci. 1963, 7, 2135-2153 describes poly(hydroxyl-ethers) (PHEs) prepared from epoxy resins and diphenols. It is known that to be a "solid" powder composition, the glass transition temperature (Tg) of the composition has to be greater than about 30° C.

It would be beneficial to the coating industry to develop powder coating formulations, powder coating processes, and powder coated articles based on SERs and phenolic epoxy resins (PERs) that (i) provide an increase in the Tg of the coating while maintaining formulation processability; and/or (ii) that maintain the Tg of the coating while improving formulation processability without affecting other key properties of the coating such as adhesion and flexibility.

SUMMARY OF THE INVENTION

The present invention is directed to a curable powder coating composition based on a divinylarene dioxide compound, such as divinylbenzene dioxide (DVBDO). For example, the composition comprises a solid curable powder coating formulation including (i) at least one divinylarene dioxide resin; and (ii) at least one curing component.

In one embodiment, the composition is a solid curable powder coating formulation including at least one divinylarene dioxide resin.

In another embodiment, the composition is a solid curable powder coating formulation including at least one divinylarene dioxide resin, wherein the divinylarene dioxide resin comprises (i) a blend of a solid epoxy resin and a divinylarene dioxide compound; or (ii) an epoxy oxazolidone resin prepared from a divinylarene dioxide compound and a monomeric isocyanate or a polymeric isocyanate; or (iii) a phenolic hardener prepared from a divinylarene dioxide compound and a diphenol.

In still another embodiment, the composition is a solid curable powder coating formulation including at least one divinylarene dioxide resin, wherein the divinylarene dioxide resin comprises a blend of a solid epoxy resin and a divinylarene dioxide compound.

In still another embodiment, the composition is a solid curable powder coating formulation including at least one divinylarene dioxide resin, wherein the divinylarene dioxide resin comprises an epoxy oxazolidone resin prepared from a divinylarene dioxide compound and a monomeric or polymeric isocyanate.

In yet another embodiment, the composition is a solid curable powder coating formulation including at least one divinylarene dioxide resin, wherein the divinylarene dioxide resin comprises a phenolic hardener prepared from a divinylarene dioxide compound and a diphenol.

The above solid curable powder coating formulations can be advantageously used for providing, for example, a fusion-bonded epoxy (FBE) coating on a substrate.

DETAILED DESCRIPTION OF THE INVENTION

The solid curable powder coating composition or formulation of the present invention generally includes at least one divinylarene dioxide resin. A "divinylarene dioxide resin" herein means a mixture containing, as one component either: (i) a divinylarene dioxide compound or (ii) a reaction product derived from a divinylarene dioxide compound. For example, a divinylarene dioxide resin can comprise, but is not limited to: (1) a mixture of a solid epoxy resin and a divinylarene dioxide compound; (2) a solid epoxy oxazolidone resin prepared from a divinylarene dioxide compound and a monomeric and/or polymeric isocyanate; (3) a solid epoxy resin prepared from a divinylarene dioxide compound; or (4) a phenolic resin prepared from a divinylarene dioxide compound and a diphenol.

In the solid curable powder coating composition of the present invention, the individual components that make up the coating composition may be solids or liquids, however, the mixture of the components are such that the final powder coating composition of the present invention is a "solid" as defined herein.

In a broad embodiment of the present invention, the solid curable powder coating formulation includes, as one component, the above-described divinylarene dioxide resin. The divinylarene dioxide resin used in the present invention is adapted to form a solid powder coating. In one embodiment, the divinylarene dioxide resin may be epoxy functional, phenolic functional, or a mixture thereof. In another embodiment, the divinylarene dioxide resin may be epoxy functional; or in still another embodiment, the divinylarene dioxide resin may be phenolic functional.

The divinylarene dioxide compound useful in forming the divinylarene dioxide resin of the present invention may comprise, for example, any substituted or unsubstituted arene nucleus bearing one, two, or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthlalene, tetrahydronaphthalene, and the like. Homologously bonded (substituted) benzenes may consist of biphenyl, diphenylether, and the like.

The divinylarene dioxide compound used for preparing the composition of the present invention may be illustrated generally by general chemical Structures I-IV as follows:

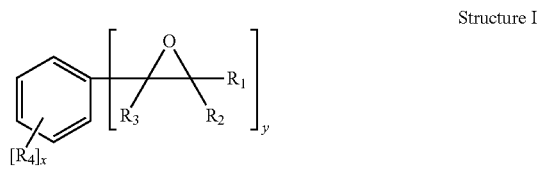

Structure I

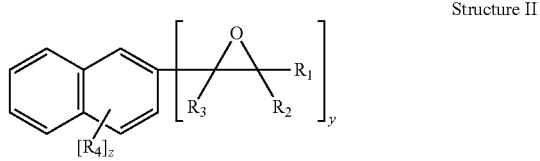

Structure II

-continued

Structure III

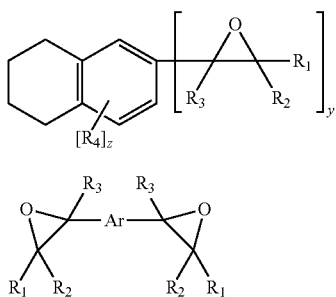

Structure IV

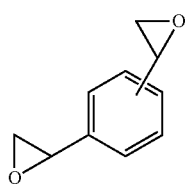

In the above Structures I, II, III, and IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In one embodiment, the divinylarene dioxide used in the present invention may be produced, for example, by the process described in U.S. Patent Provisional Application Ser. No. 61/141,457, filed Dec. 30, 2008, by Marks et al., incorporated herein by reference. The divinylarene dioxide compositions that are useful in the present invention are also disclosed in, for example, U.S. Pat. No. 2,924,580, incorporated herein by reference.

In another embodiment, the divinylarene dioxide useful in the present invention may comprise, for example, divinylbenzene dioxide, divinylnaphthalene dioxide, divinylbiphenyl dioxide, divinyldiphenylether dioxide, and mixtures thereof.

In a preferred embodiment of the present invention, the divinylarene dioxide compound used in the epoxy resin formulation may be for example divinylbenzene dioxide (DVBDO). Most preferably, the divinylarene dioxide compound that is useful in the present invention includes, for example, DVBDO as illustrated by the following chemical formula of Structure V:

Structure V

The chemical formula of the above DVBDO compound may be as follows: $C_{10}H_{10}O_2$; the molecular weight of the DVBDO is about 162.2; and the elemental analysis of the DVBDO is about: C, 74.06; H, 6.21; and O, 19.73 with an epoxide equivalent weight of about 81 g/mol.

Divinylarene dioxides, particularly those derived from divinylbenzene such as for example DVBDO, are class of diepoxides which have a relatively low liquid viscosity but a higher rigidity and crosslink density than conventional epoxy resins.

Structure VI below illustrates an embodiment of a preferred chemical structure of the DVBDO useful in the present invention:

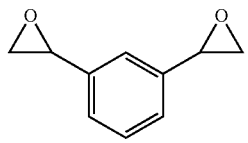

Structure VI

Structure VII below illustrates another embodiment of a preferred chemical structure of the DVBDO useful in the present invention:

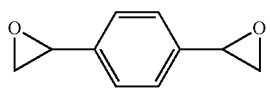

Structure VII

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) and para isomers of DVBDO, respectively. The ortho isomer is rare; and usually DVBDO is mostly produced generally in a range of from about 9:1 to about 1:9 ratio of meta (Structure VI) to para (Structure VII) isomers. The present invention preferably includes as one embodiment a range of from about 6:1 to about 1:6 ratio of Structure VI to Structure VII, and in other embodiments the ratio of Structure VI to Structure VII may be from about 4:1 to about 1:4 or from about 2:1 to about 1:2.

In yet another embodiment of the present invention, the divinylarene dioxide may contain quantities (such as for example less than about 20 wt %) of substituted arenes. The amount and structure of the substituted arenes depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene monoxide while DEB remains unchanged. The presence of these compounds can increase the epoxide equivalent weight (as measured by ASTM D-1652) of the divinylarene dioxide to a value greater than that of the pure compound but can be utilized at levels of 0 to 99% of the epoxy resin portion.

In one embodiment, the divinylarene dioxide useful in the present invention comprises, for example, DVBDO, a low viscosity liquid epoxy resin. The viscosity of the divinylarene dioxide used in the process of the present invention ranges generally from about 0.001 Pa s to about 0.1 Pa s, preferably from about 0.01 Pa s to about 0.05 Pa s, and more preferably from about 0.01 Pa s to about 0.025 Pa s, at 25° C.

The thermal stability of the divinylarene dioxides of the present invention is sufficient to allow formulating or processing the divinylarene dioxides at moderate temperatures (for example, at temperatures of from about 100° C. to about 200° C.) for up to several hours (for example, for at least 2 hours) without oligomerization or homopolymerization. Oligomerization or homopolymerization during formulation or processing is evident by a substantial increase (e.g., greater than 50 fold) in viscosity or gelling (crosslinking). The divinylarene dioxides of the present invention have sufficient thermal stability such that the divinylarene dioxides do not experience a substantial increase in viscosity or gelling during formulation or processing at the aforementioned moderate temperatures.

Another advantageous property of the divinylarene dioxide useful in the present invention is its rigidity. The rigidity property of the divinylarene dioxide is measured by a calculated number of rotational degrees of freedom of the dioxide excluding side chains using the method of Bicerano described in Prediction of Polymer Properties, Dekker, New York, 1993. The rigidity of the divinylarene dioxide used in the present invention may range generally from about 6 to about 10, preferably from about 6 to about 9, and more preferably from about 6 to about 8 rotational degrees of freedom.

The concentration of the divinylbenzene dioxide in the powder coating formulation of the present invention will depend on what other formulation ingredients are used in the formulation and will depend on the concentrations of the other formulation ingredients. In general, the concentration of the divinylarene oxide used in the present invention as component (a) of the formulation may range generally from about 0.5 weight percent (wt %) to about 99 wt % in one embodiment; from about 1 wt % to about 98 wt % in another embodiment; from about 2 wt % to about 95 wt % in still another embodiment; and from about 5 wt % to about 90 wt % in yet another embodiment, based on the weight of the total composition.

In another embodiment, the epoxy resin powder coating composition of the present invention includes at least one divinylarene dioxide resin, wherein the divinylarene dioxide resin comprises a blend of (a) at least one divinylarene dioxide compound; and (b) at least one solid epoxy resin. The divinylarene dioxide compound, component (a) of this embodiment, is the same as the divinylarene dioxide compound described above.

Generally, the amount of divinylarene dioxide compound used in the present invention to form the blend may be in the range of from about 0.1 wt % to about 50 wt %; and generally, the amount of the solid epoxy resin for preparing the blend of the present invention may be in the range of from about 99.9 wt % to about 50 wt %.

The solid epoxy resin, component (b) which makes up the divinylarene dioxide resin blend of the powder coating composition of the present invention, may include, for example, solid epoxy resins known to those skilled in the art. A "solid epoxy resin" or "SER" is defined herein as an epoxy-functional resin that has a Tg generally greater than about 30° C. Generally, the SERs useful in the present invention are higher molecular weight (MW) advanced epoxy resins made, for example, by advancing a lower molecular weight liquid epoxy resin (LER) with a di-functional compound such as a diphenol, a monomeric isocyanate and/or a polymeric isocyanate.

For example, the LER resins useful in the present invention include a wide variety of epoxy compounds. Typically, the epoxy compounds are epoxy resins which are also referred to as polyepoxides. Polyepoxides useful herein can be monomeric (for example, the diglycidyl ether of bisphenol A, novolac-based epoxy resins, and tris-epoxy resins), higher molecular weight advanced resins (for example, the diglycidyl ether of bisphenol A advanced with bisphenol A) or polymerized unsaturated monoepoxides (for example, glycidyl acrylates, glycidyl methacrylate, allyl glycidyl ether, etc.), homopolymers or copolymers. Most desirably, epoxy compounds contain, on average, at least one pendant or terminal 1,2-epoxy group (that is, vicinal epoxy group) per molecule.

Examples of useful polyepoxides include the polyglycidyl ethers of both polyhydric alcohols and polyhydric phenols; polyglycidyl amines; polyglycidyl amides; polyglycidyl imides; polyglycidyl hydantoins; polyglycidyl thioethers; epoxidized fatty acids or drying oils, epoxidized polyolefins, epoxidized di-unsaturated acid esters; epoxidized unsaturated polyesters; and mixtures thereof. Polyepoxides can also be manufactured by reacting diglycidyl ethers with isocyanates so as to obtain an epoxy-terminated oligomer containing an oxazolidone structure for example, the reaction products of a diglycidyl ether of bisphenol-A and MDI.

Numerous polyepoxides prepared from polyhydric phenols include those which are disclosed, for example, in U.S. Pat. No. 4,431,782. Polyepoxides can be prepared from mono-, di- and tri-hydric phenols, and can include the novolac resins. Poly-epoxides can include the epoxidized cyclo-olefins; as well as the polymeric polyepoxides which are polymers and copolymers of glycidyl acrylate, glycidyl methacrylate and allylglycidyl ether. Suitable polyepoxides are disclosed in U.S. Pat. Nos. 3,804,735; 3,892,819; 3,948,698; 4,014,771 and 4,119,609; and Lee and Neville, Handbook of Epoxy Resins, Chapter 2, McGraw Hill, N.Y. (1967).

For example, polyepoxides useful as the LERs are glycidyl polyethers of polyhydric alcohols or polyhydric phenols having an epoxide equivalent weight (EEW) of from 150 to 300; preferably an EEW of from 170 to 200; while an SER has an EEW of generally greater than about 300. These LERs are usually made by reacting at least two moles of an epihalohydrin or glycerol dihalohydrin with one mole of the polyhydric alcohol or polyhydric phenol, and a sufficient amount of a caustic alkali to combine with the halohydrin. The products are characterized by the presence of more than one epoxide group, that is, a 1,2-epoxy equivalency greater than one.

In addition to the SER used in this embodiment, other epoxy resins can be used in the present invention as optional additives such as the LERs described above or other polyepoxides such as a cycloaliphatic diene-derived epoxide. These polyepoxides can be cured either thermally, cationically or photoinitiation (example UV initiated cure). There are several cycloaliphatic epoxides that are made and marketed by The Dow Chemical Company such as 3,4-epoxycyclohexylmethyl-3,4-epoxycyclohexyl carboxylate; 1,2-epoxy-4-vinylcyclohexane; bis(7-oxabicyclo[4.1.0]hept-3-ylmethyl hexanedioic acid ester; 3,4-epoxycyclohexanecarboxylate methyl ester; and mixtures thereof.

Other epoxy resins that may be used as optional additives in the present invention are described in U.S. Patent Application Ser. No. 61/267,947, entitled "Epoxy Resins Compositions", filed Dec. 9, 2009 by Maurice Marks; which is incorporated herein by reference.

The solid epoxy resin blended with a divinylarene dioxide compound of the present invention advantageously provides a modified epoxy resin with melt viscosities and softening points lower than an unmodified epoxy resin. In addition the Tg of the cured material from the modified epoxy resin is higher than the Tg of the cured material from the unmodified epoxy resin.

In this embodiment of the present invention, the powder coating composition including the divinylarene dioxide compound and solid epoxy resin blend, such as when a SER is blended with DVBDO, the melt viscosity of the resulting blend is reduced significantly as measured by ASTM D-445 thus, improving the flow of the resulting powder coating formulation as measured by ASTM D4242-07.

In still another embodiment, the epoxy resin powder coating composition of the present invention includes at least one divinylarene dioxide resin, wherein the divinylarene dioxide resin comprises an epoxy terminated oxazolidone resin (ETOR) prepared by reacting (i) at least one divinylarene dioxide compound, and (ii) at least one monomeric and/or polymeric isocyanate. In this embodiment, the resultant reaction product is an ETOR useful for preparing a curable powder coating composition with a balance of beneficial properties. For example, powder coatings based on the ETORs of the present invention have either (1) a higher Tg and similar flexibility as measured by CSA Z245.20-06; or (2) a similar Tg and higher flexibility (as measured by CSA Z245.20-06) compared to powder coatings prepared from known SERs, PERs, and PHEs.

The divinylarene dioxide compound, component (i) useful for forming the ETOR of the above embodiment, is the same as component (a) described above. In addition, the monomeric and polymeric isocyanates, component (ii) useful for forming the ETOR in this embodiment, which in turn, is useful for forming the powder coating composition of the present invention, may include, for example an aliphatic monomeric isocyanate or aliphatic polymeric isocyanate; an aromatic monomeric isocyanate or aromatic polymeric isocyanate; or mixtures thereof. Suitable examples of the monomeric and polymeric isocyanates include monomeric or polymeric isocyanates selected from toluene diisocyanate, methylenediphenyl diisocyanate, xylylene diisocyanate, isophorone diisocyanate, hexamethylene diisocyanate, and mixtures thereof. Other ETORs useful in the present invention are described, for example, in U.S. Pat. No. 5,112,932; and in U.S. Pat. No. 8,871,892; both references which are incorporated herein by reference.

The epoxy terminated oxazolidone resins used in the present invention bear terminal epoxide groups which allow the reaction of the epoxy terminated oxazolidone resins with curing agents and/or catalysts to form thermosets powder coatings. Upon crosslinking, the resulting thermosets have high Tg and/or same flexibility.

In yet another embodiment, the epoxy resin powder coating composition includes at least one divinylarene dioxide resin, wherein the divinylarene dioxide resin comprises a phenolic hardener prepared by reacting (A) at least one divinylarene dioxide, and (B) at least one diphenol. In this embodiment, the resultant reaction product formed by reacting (A) at least one divinylarene dioxide compound, and (B) at least one diphenol is a hydroxyl-function polyether useful for preparing a curable powder coating composition.

The novel hydroxyl-function polyethers of the present invention increases the Tg of the powder coating as measured by CSA Z245.20-06 compared to powder coatings prepared from known SERs, PERs, and PHEs.

The divinylarene dioxide compound, component (A) of the above embodiment, is the same as component (a) described above. The diphenol, component (B), useful for forming the hydroxyl-function polyether in the above embodiment, which in turn, is useful in preparing the powder coating formulation of the present invention, may comprise any of the diphenols well-known in the art, such as for example, bisphenol A, bisphenol F, tetrabromobisphenol A, and mixtures thereof. In one preferred embodiment, the diphenol useful in the composition of the present invention comprises bisphenol A. Other diphenols which may be used in the present invent are described in U.S. Patent Application Ser. No. 61/141,465 entitled "Hydroxyl-Functional Polyethers and a Preparation Process Therefor", filed Dec. 30, 2008 by Maurice Marks; which is incorporated herein by reference.

Other optional components that may be useful in the powder coating formulation of the present invention are components normally used in coating formulations known to those skilled in the art. For example, the optional components may comprise compounds that can be added to the composition to enhance application properties (e.g., surface tension modifiers or flow aids), reliability properties (e.g., adhesion promoters), the reaction rate, the selectivity of the reaction, and/or the catalyst lifetime.

Examples of optional additives that may be added to the coating compositions of the present invention include other resins such as epoxy resins that are different from the divinylarene dioxide compound, diluents, stabilizers, fillers, plasticizers, catalyst de-activators, and the like; and mixtures thereof. Such optional additives may be added to the reaction mixture during the reaction or prior to recovery of the reaction product.

The concentration of the optional additives used in the present invention may range generally from 0 wt % to about 99 wt %, preferably from about 0.001 wt % to about 95 wt %, more preferably from about 0.01 wt % to about 10 wt %, and most preferably from about 0.05 wt % to about 5 wt %.

In a broad embodiment of the present invention, the solid curable powder coating formulation includes, as one component, a curing component. For example, when the divinylarene dioxide resin is epoxy functional, the curing component may be an epoxy curing agent,r an epoxy curing catalyst, or mixtures thereof. In another embodiment, when the divinylarene dioxide resin is phenolic functional, the curing component may be an epoxy resin, a blend of an epoxy resin and a curing catalyst, or a mixture thereof. The curing component used in the present invention is adapted to form a solid powder coating.

The curing component, useful in the present invention, includes for example, a compound which reacts with the reactive groups of the divinylarene dioxide resin. For example, in cases where the divinylarene dioxide resin is epoxy functional, the curing component is an epoxy curing agent (also referred to as a hardener or cross-linking agent), and may be catalytic or co-reactive. This class of compounds forming the curing component, useful for preparing the curable powder coating composition of the present invention, may be any compound having an active group being reactive with an epoxy group of an epoxy resin. For example, the curing agent useful in the present invention includes nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; and catalytic curing agents such tertiary amines, Lewis acids, Lewis bases and combinations of two or more of the above curing agents.

Suitable curing components may also include, but are not limited to, dicyandiamide, its derivate and adducts such as o-tolyl biguanide (OTB); amino group containing compounds, imidazoles and adduct of imidazoles, phenolic resins such bisphenol-A based, phenol novolac or cresol-novolac phenolic resins; carboxyl functional resins such as polyester and acrylic resins, blocked isocyanates, anhydrides and others.

Polyamines, dicyandiamide, diaminodiphenylsulfone and their isomers, aminobenzoates, various acid anhydrides, phenol-novolac resins and cresol-novolac resins, for example, may be used as the curing component in the present invention, but the present invention is not restricted to the use of these compounds.

In another embodiment, in cases where the divinylarene dioxide resin is phenolic functional, the curing component may include an epoxy resin such as described above or the epoxy resin in combination with a curing catalyst. For example, the curing catalyst useful for preparing the curable powder coating composition of the present invention, may include for example imidazole derivatives, tertiary amines, and organic metallic salts. Preferably, the curing catalyst is used in an amount from 0 to about 20 parts by weight based on the total weight of the curable powder coating composition of the present invention.

Generally, the amount of curing component used in the present invention may be in the range of from about 0.01 wt % to about 20 wt %.

The curable epoxy powder coating resin composition of the present invention may also contain additives such as fillers, dyes, pigments, thixotropic agents, photo initiators, latent catalysts, inhibitors, additives to modify specific processing or coating properties such as flow modifiers, accelerators, desiccating additives, surfactants, adhesion promoters, fluidity control agents, stabilizers, additives that aid in processing; flexibilizers, and fire retardants; and any other substances which are required for the manufacturing, application or proper performance of the powder coating. The amount of the optional additives used in the curable powder coating composition of the present invention generally may be from 0 weight percent to about 70 weight percent depending on the final formulation.

In one preferred embodiment, the composition of composition of the present invention may include a filler. The fillers that may be used in the present invention can include for example, wollastonite, barites, mica, feldspar, talc, calcium carbonate; and pigments such as titanium dioxide, carbon black, iron oxides, chrome oxide, organic pigments and dyes.

The process for preparing a curable powder coating composition of the present invention includes mixing or blending (I) the at least one divinylarene dioxide resin which has previously been prepared as described above; (II) the at least one curing component as described above; and (III) optionally, any of the above-mentioned optional assorted formulation additives or ingredients as desired that are not detrimental to the properties of the curable powder coating composition when added. Any of the optional additives, for example fillers, may be added to the composition during the mixing or prior to the mixing to form the composition.

In the preparation of the curable powder coating composition of the present invention, the components described above are mixed together by known means in the art at conditions to form a curable composition. The curable powder coating composition of the present invention can be produced by mixing all the components of the composition together in any order. All the components of the curable powder coating composition of the present invention are typically mixed and dispersed at a temperature enabling the preparation of an effective powder coating composition having the desired properties. Compared to the compositions of the prior art, cured products made from the powder coating compositions of the present invention have a better balance of properties.

The flow of the resulting powder coating formulation prepared by the process of the present invention as measured by ASTM D4242-07 is generally lower than the corresponding formulation prepared using analogous bisphenol A diglycidyl ether resin by at least 5 percent (%), preferably by at least 10%, and most preferably by at least 20%.

The Tg of the cured powder coating composition of the present invention is generally greater than the corresponding formulation prepared using analogous bisphenol A diglycidyl ether resin by at least 3%, preferably by at least 4%, and most preferably by at least 5% as measured by the glass transition temperature (Tg) using differential scanning calorimetry (DSC).

The curable powder coating epoxy resin composition containing the at least one divinylarene dioxide resin of the present invention is used for preparing a coating on various substrates. For example, the curable powder coating composition may be applied to a substrate by any well known methods such as electrostatic spraying, fluidized bed, electromagnetic brush, powder cloud or by spraying the powder with conventional powder spraying equipment onto the pre-heated substrate with or without electromagnetic charging the powder (this method is also known as fusion bonded process).

The curable powder coating composition of the present invention can be cured according to typical processes practiced by the industry. For example, curing the thermosettable or curable powder coating composition of the present invention may be carried out at a predetermined temperature and for a predetermined period of time sufficient to cure the composition and the curing may be dependent on the hardeners used in the formulation as known by those skilled in the art of powder coatings. Typically, the curing is carried out at a temperature, generally in the range of from about 10° C. to about 300° C., preferably from about 50° C. to about 275° C., more preferably from about 75° C. to about 250° C., and most preferably from about 100° C. to about 240° C. In another embodiments, the temperature of curing can range generally from about ambient temperature cure (for example, about 20° C.) to elevated temperature cures (for example, from about 100° C. to about 250° C.) using thermal, radiation or a combination of energy sources.

As is generally known, the time of cure may range generally from seconds to several hours depending on the curing agent and the components in the curable resin compositions. Typically, the time of curing may be, for example, from 1 minute to 30 minutes.

The curable composition can be cured in one step or multiple steps or the curable composition can be post-cured using a different temperature or energy source after the initial cure cycle.

The Tg of the cured coatings is measured using a TA Instruments DSC Q100. A 10° C./minute temperature ramp from 30° C. to 150° C. may be carried out and the Tg is measured considering the half-height of the heat flow curve. Upon crosslinking, the thermoset coating product of the present invention has a high Tg and/or good flexibility as measured by CSA Z245.20-06.

EXAMPLES

The following examples and comparative examples further illustrate the present invention in detail but are not to be construed to limit the scope thereof.

In the following Examples, various terms and designations are used such as for example:

"SER" stands for solid epoxy resin.
"DVBDO" stands for divinylbenzene dioxide.
"FBE" stands for Fusion Bonded Epoxy.
"EEW" stands for epoxide equivalent weight.
"BA" stands for bisphenol A.
"BADGE" stands for bisphenol A diglycidyl ether.
"MDI" stands for methylenediphenyl diisocyanate.
DER 664UE is a solid epoxy resin commercially available from The Dow Chemical Company having an epoxide equivalent weight of 915 g/eq., a viscosity at 150° C. of 6030 mPa-s, and a Tg of 60° C.

DER 669E is a solid epoxy resin commercially available from The Dow Chemical Company having an epoxide equivalent weight of 3200 g/eq.

DEH 87 is a phenolic curing agent commercially available from The Dow Chemical Company having a phenolic equivalent weight of 460 g/eq., a viscosity at 150° C. of 1330 mPa-s, and a Tg of 50° C.

Epicure P 101 is an imidazole Liquid epoxy resin adduct curing agent commercially available from Hexion.

Modaflow Powder III is a flow modifier and commercially available from Solutia Inc.

Minspar 7 is a ground feldspar produced by IMERYS.

Cab-O-Sil M5 is an untreated fumed silica produced by CABOT.

Amicure CG 1200 is a dicyandiamide (dicy), commercially available from Air Products & Chemicals, Inc.

In the following Examples, standard analytical equipment and methods are used such as for example:

Melt viscosity ($\eta$) is measured by a parallel plate rheometer at a temperature of 150° C. and a frequency of 10 s$^{-1}$.

Number average molecular weight ($M_n$) is calculated using the method of Miller and Macosko.

Mixture Tg and $M_n$ are calculated using the inverse weight rule of mixtures, such that for mixture property P, component weight fraction $w_i$ and component property $P_i$: $1/P = w_1/P_1 + w_2/P_2$ Mixture melt viscosity is calculated using the logarithmic rule of mixtures as follows:

$$\ln(\eta) = w_1 \ln(\eta_1) + w_2 \ln(\eta_2)$$

General Process for Producing a Thermoset from a Powder Coating Composition

One embodiment of a general process for producing the thermoset product form the powder coating of the present invention may be as follows: a formulation of the present invention is weighed in a semi-analytical scale and pre-blended in a high intensity mixer PRIZM PILOT 3 for 30 seconds at 2300 rpm. The pre-blended material is then extruded through a PRIZM 24 mm extruder using 35° C. in the feed zone of the extruder, 70° C. in the middle zone of the extruder and 90° C. in the head of the extruder at 400 rpm. The extruded material is fed to a chilled roll and then passed through a crusher, reducing the chilled material to flakes. The crushed flakes are then fed to a Hosokawa Micropul ACM-2 mill and reduced to a powder of approximately 43 micron average particle size.

General Process for Applying a Powder Coating to a Substrate

One embodiment of a general process for applying the powder coating composition of the present invention on a substrate may be as follows: a 1 inch×6 inches×⅝ inch (2.5× 15.0×1.6 centimeters) cold rolled steel bars are prepared by shot blasting with steel grit to a white metal finish with and anchoring profile between 2.5 and 4.5 mils The steel bars are then pre-heated to 242° C. for 30 minutes in a convection oven. The bars are then taken out of the oven and immediately dipped in a fluidized bed containing the powder coating. The dipping time is controlled to provide a coating on the bars wherein the thickness of the coating is between 14 mils and 16 mils. The coated bars are then taken back to the oven at 242° C. After 2 minutes in the oven, the bars are removed, allowed to cool outside of the oven at ambient temperature for 2 minutes and then immersed into a running water bath also at ambient temperature until cold.

Comparative Example A

In this Comparative example A, a Fusion Bonded Epoxy (FBE) powder coating formulation is prepared using a SER and a phenolic resin. The FBE powder coating formulation is prepared by compounding 512 g of DER 664UE with 262 g of DEH 87 phenolic curing agent; 10 g of Epicure P 101; 10 g of Modaflow Powder III; 206 g of Minspar 7; and 5 g of Cab-O-Sil M5. A steel bar as specified by CSA Z245.20-06 is heated to 242° C., and then the steel bar is immersed in the above resulting powder coating formulation to give a FBE coating on the steel bar. The FBE coating shows a Tg of 88° C. comparative Example B In this Comparative Example B, a FBE powder coating formulation is prepared using an oxazolidone SER and a dicyandiamide. The FBE powder coating formulation is prepared by compounding 745 g of an oxazolidone solid epoxy resin prepared from 2 moles of BADGE and 1 mole of MDI with 39 g of dicyandiamide (Amicure CG 1200); 10 g of Epicure P 101; 10 g of Modaflow Powder III; 196 g of Minspar 7; and 5 g of Cab-O-Sil M5. A steel bar is heated to 242° C., and then the steel bar is immersed in the above resulting powder coating formulation to give a FBE coating on the steel bar. The FBE coating shows a Tg of 173° C.

Comparative Example C

In this Comparative Example C, a FBE powder coating formulation is prepared using a SER and a dicyandiamide. The FBE powder coating formulation is prepared by compounding 766 g of DER 664UE with 18 g of dicyandiamide (Amicure CG 1200); 10 g of Epicure P 101; 10 g of Modaflow Powder III; 196 g of Minspar 7; and 5 g of Cab-O-Sil M5. A steel bar CSA Z245.20-06 is heated to 242° C., and then the steel bar is immersed in the above resulting powder coating formulation to give a FBE coating on the steel bar. The FBE coating shows a Tg of 103° C.

Example 1

In this Example 1, a FBE powder coating formulation is prepared using a SER and a bisphenol A-DVBDO phenolic resin. The FBE powder coating formulation is prepared by compounding 602 g of DER 664UE with 175 g of a BA-DVBDO phenolic hardener having a viscosity at 150° C. of 460 mPa-s and a Tg of 52° C.; 10 g of Epicure P 101; 10 g of Modaflow Powder III; 203 g of Minspar 7; and 5 g of Cab-O-Sil M5. A steel bar is heated to 242° C., and then the steel bar is immersed in the above resulting powder coating formulation to give a FBE coating on the steel bar. The FBE coating shows a Tg of 93° C.

Example 2

In this Example 2, a FBE powder coating formulation is prepared using a DVBDO-oxazolidone SER and a dicyandiamide. The FBE powder coating formulation is prepared by compounding 733 g of an oxazolidone epoxy resin made from 2 moles of DVBDO and 1 mole of MDI with 51 g of Amicure CG 1200; 10 g of Epicure P 101; 10 g of Modaflow Powder III; 195 g of Minspar 7; and 5 g of Cab-O-Sil M 5. A steel bar is heated to 242° C., and then the steel bar is immersed in the above resulting powder coating formulation to give a FBE coating on the steel bar. The FBE coating shows a Tg of 196° C.

Example 3

In this Example 3, a SER is blended with DVBDO. To a mixing vessel is added 240 g of D.E.R. 669E epoxy resin and 24 g of DVBDO. The resulting mixture is heated with stirring to ensure a homogenous blend. The resulting SER blend has an epoxide equivalent weight (EEW) of 715 g/eq, a $M_n$ of 1,430 g/mole, and a Tg of 63° C.

Example 4

In this Example 4, a FBE powder coating formulation is prepared using a SER-DVBDO blend and a dicyandiamide. The FBE powder coating formulation is prepared by compounding 761 g of the SER prepared in Example 3 with 22 g of Amicure CG 1200; 10 g of Epicure P 101; 10 g of Modaflow Powder III; 196 g of Minspar 7; and 5 g of Cab-O-Sil M5. A steel bar is heated to 180° C.; and then the steel bar is immersed in the above resulting powder coating formulation to give a FBE coating on the steel bar. The FBE coating shows a Tg of 110° C.

TABLE I

Results

| Example | Epoxy Resin | Hardener | Formulation Viscosity (mPa-s, at 150° C.) | % Δ Viscosity (Control vs. Example) | Cured Tg (° C.) | % ΔTg (Control vs. Example) |
|---|---|---|---|---|---|---|
| Comparative Example A | DER 664UE | DEH 87 | 3170 | | 88 | |
| Example 1 | DER 664UE | BA-DVBDO phenolic | 2560 | −19 | 93 | +6 |
| Comparative Example B | BADGE-MDI | dicy | | | 173 | |
| Example 2 | DVBDO-MDI | dicy | | | 196 | +13 |
| Comparative Example C | DER 664UE | dicy | | | 103 | |
| Example 4 | DER 669E + DVBDO | dicy | | | 110 | +7 |

What is claimed is:

1. A composition comprising a solid curable powder coating formulation including
   (i) at least one divinylarene dioxide resin, wherein the at least one divinylarene dioxide resin is selected from the group consisting of: (I) a divinylarene dioxide compound, (II) a blend of (IIa) a solid epoxy resin and (IIb) a divinylarene dioxide compound, (III) an epoxy oxazolidone resin prepared from (IIIa) a divinylarene dioxide compound and (IIIb) a monomeric isocyanate and/or a polymeric isocyanate; (IV) a solid epoxy resin prepared from a divinylarene dioxide compound; and (V) a hydroxyl-functional polyether prepared from (Va) a divinylarene dioxide compound and (Vb) a diphenol; wherein the at least one divinylarene dioxide resin is phenolic functional; and
   (ii) at least one curing component wherein the at least one curing component comprises an epoxy resin, a blend of an epoxy resin and a curing catalyst, or mixtures thereof; wherein the formulation melt viscosity at 150° C., as measured by ASTM D4242-07, is at least 5 percent lower than a corresponding formulation prepared using a bisphenol A diglycidyl ether resin instead of the at least one divinylarene dioxide resin as listed in (i) above; and wherein the solid curable powder coating formulation when cured is adapted to provide a cured powder coating thermoset having a glass transition temperature, as measured by differential scanning calorimetry, of at least 3 percent greater than a cured powder coating thermoset cured from a corresponding cured formulation prepared using a bisphenol A diglycidyl ether resin instead of the at least one divinylarene dioxide resin as listed in (i) above.

2. The composition of claim 1, wherein the at least one divinylarene dioxide compound is divinylbenzene dioxide.

3. The composition of claim 1, wherein the solid epoxy resin, component (IIa), comprises an epoxy resin prepared from a stoichiometric excess of bisphenol A diglycidyl ether and bisphenol A having a Tg of greater than about 30° C.

4. The composition of claim 1, wherein the epoxy oxazolidone resin, component (III) comprises the reaction product of (IIIa) a stoichiometric excess of divinylbenzene dioxide and (IIIb) a monomeric or polymeric isocyanate selected from toluene diisocyanate, methylenediphenyl diisocyanate, xylylene diisocyanate, isophorone diisocyanate, hexamethylene diisocyanate, and mixtures thereof.

5. The composition of claim 1, wherein the hydroxyl-functional polyether, component (V), comprises the reaction product of (Va) divinylbenzene dioxide and (Vb) a stoichiometric excess of a diphenol selected from the group consisting of bisphenol A, tetrabromobisphenol A, bisphenol F, hydroquinone, resorcinol, biphenol, and mixtures thereof.

6. The composition of claim 1, wherein the catalyst comprises an imidazole.

7. The composition of claim 1, wherein the curing component comprises a phenolic resin, or an amine, or an epoxy resin.

8. The composition of claim 1, wherein the curing component comprises a bisphenol A type phenolic resin or a dicyandiamide.

9. The composition of claim 1, wherein the powder coating comprises a fusion bonded epoxy coating composition.

10. A cured coating comprising the cured composition of claim 1.

11. An article made from the composition of claim 1.

12. The article of claim 11 comprising a coated substrate wherein the coating on said substrate comprises a solid divinylarene dioxide resin.

13. A process for preparing a curable powder coating composition comprising admixing:
   (i) at least one divinylarene dioxide resin, wherein the at least one divinylarene dioxide resin is selected from the group consisting of: (I) a divinylarene dioxide compound, (II) a blend of (IIa) a solid epoxy resin and (IIb) a divinylarene dioxide compound, (III) an epoxy oxazolidone resin prepared from (IIIa) a divinylarene dioxide compound and (IIIb) a monomeric isocyanate and/or a polymeric isocyanate; (IV) a solid epoxy resin prepared from a divinylarene dioxide compound; and (V) a hydroxyl-functional polyether prepared from (Va)

a divinylarene dioxide compound and (Vb) a diphenol; wherein the at least one divinylarene dioxide resin is phenolic functional; and
(ii) at least one curing component to form a solid curable powder coating formulation wherein the at least one curing component comprises an epoxy resin, a blend of an epoxy resin and a curing catalyst, or mixtures thereof;
wherein the formulation melt viscosity at 150° C., as measured by ASTM D4242-07, is at least 5 percent lower than a corresponding formulation prepared using a bisphenol A diglycidyl ether resin instead of the at least one divinylarene dioxide resin as listed in (i) above; and wherein the solid curable powder coating formulation when cured is adapted to provide a cured powder coating thermoset having a glass transition temperature, as measured by differential scanning calorimetry, of at least 3 percent greater than a cured powder coating thermoset cured from a corresponding cured formulation prepared using a bisphenol A diglycidyl ether resin instead of the at least one divinylarene dioxide resin as listed in (i) above.

14. A process for preparing a cured coating comprising curing the composition of claim 1 at a temperature of from about 10° C. to about 300° C.

\* \* \* \* \*